Oct. 2, 1962        G. A. MARSH ETAL        3,056,284
SCALE AND CORROSION-MEASURING DEVICE AND METHOD
Filed Nov. 3, 1958
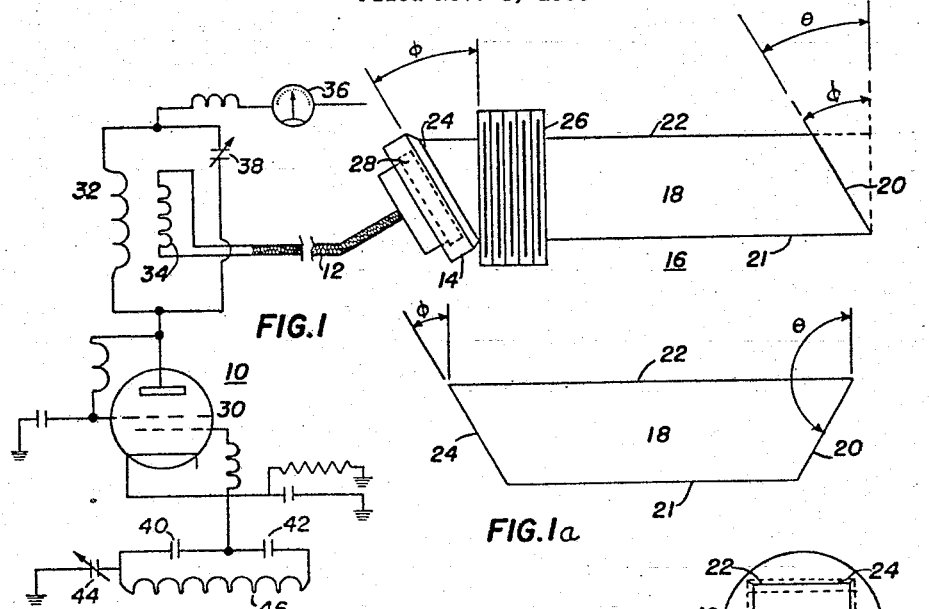
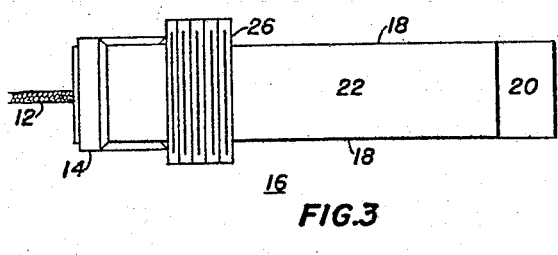
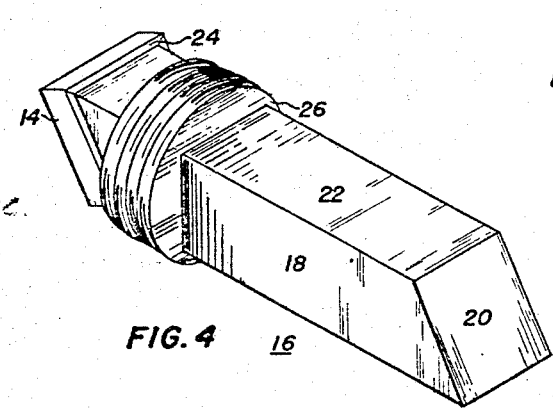
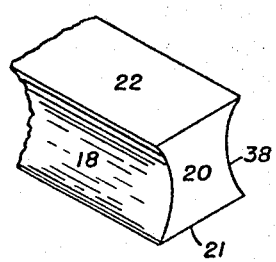
INVENTORS
GLENN A. MARSH
BY   EDWARD SCHASCHL
ATTORNEY

United States Patent Office 3,056,284
Patented Oct. 2, 1962

3,056,284
SCALE AND CORROSION-MEASURING
DEVICE AND METHOD
Glenn A. Marsh and Edward Schaschl, Crystal Lake, Ill.,
assignors to The Pure Oil Company, Chicago, Ill., a
corporation of Ohio
Filed Nov. 3, 1958, Ser. No. 771,423
4 Claims. (Cl. 73—67.8)

This invention relates to a method and apparatus of particular design adapted to the determination of a coating of foreign material on, or loss of exposed surface from, a test or reflectance element when said test element is exposed to an atmosphere under test. This invention is based on the discovery that the sensitivity and utility of instruments employing ultrasonic vibrations for such determinations can be greatly extended by providing a test element in conjunction therewith which has a particular resonance frequency whereby ratios of acoustical impedances can be determined, or differences in frequencies of ultrasonic vibration necessary to obtain resonance in the test element can be measured. There is provided in this invention a test or reflectance element which is of such a shape that ultrasonic waves of a constant frequency set up a resonance therein by repeated reflections back and forth between the ends and parallel sides. Means are provided to either measure the power requirements to maintain the original resonant frequency or to attain a different resonant frequency during or after a test period.

The principle of the ultrasonic thickness gage, an example of which is known in the art as the "Audigage," is described by N. G. Branson in his article entitled, "Portable Ultrasonic Thickness Gage," appearing in Electronics, January 1948, pages 88 to 91. This instrument and its operation depend on the reflectance of ultrasonic vibrations introduced into a metal wall by means of a vibrating quartz crystal, which is held to the surface of the wall of a process vessel. The instrument includes means for detecting the frequency of resonance and changes thereof due to decreases in wall thickness. Branson observes that materials such as scale, coke, and other deposits that may form on an inner surface of a tank or pipe are poor conductors of ultrasonic waves. Because these deposits are poor conductors, they do not introduce errors into measurements of the thickness of the metal. However, they do diminish the strength of the reflected signal, and reduce the sensitivity of the instrument. Branson's device is limited in that pitting of the metal surface introduces errors, and in general only bodies of uniform thickness can be measured with accuracy. Under carefully controlled conditions, the prior art ultrasonic devices give an accuracy of from about 1% to 5%. The present invention overcomes these shortcomings and increases the utility, scope and accuracy of thickness measurements by ultrasonic means.

It becomes a primary object of this invention to provide a method and apparatus adapted to the determination of a coating of foreign material, or extent of loss of surface, on or from a test element in contact with the atmosphere under consideration.

Another object of the invention is to provide a method for determining the tendency of an atmosphere to form a deposit of foreign material on the surfaces which it contacts.

An object of this invention is to provide an apparatus for determining the rate at which an atmosphere forms a deposit of foreign materials on the surfaces contacted by same.

An object of this invention is to provide a method for determining the tendency of an atmosphere to erode or corrode the surfaces which it contacts.

And still a further object of this invention is to provide an apparatus for determining the tendency of an atmosphere to erode or corrode the surfaces which it contacts.

These and further objects of the invention will become apparent or be described as the specification hereon proceeds.

One feature of this invention is the employment of a solid test element having at least two pairs of spaced reflecting surfaces, wherein the surfaces of one of said pairs are parallel to each other, and the surfaces of the other pair are non-parallel and intersect the parallel surfaces at oblique angles, that is, being either at angles greater or less than 90°. Another feature of the invention is the provision of a combination of means for indicating energy input, means for generating ultrasonic vibrations in the test element, and a solid test element adapted to reflect said vibrations in amounts proportional to the surface condition of the element. Another feature of the invention is a combination of means for indicating energy input, means for varying said energy input, means for generating ultrasonic vibrations therefrom, and a solid test element as above defined. These and other features of the invention are described in more detail in the following paragraphs.

The invention is best understood by reference to the attached drawings in which:

FIGURE 1 is a side view of one form of reflectance element shown connected with an Audigage with a general representation of the electrical circuit therefor.

FIGURE 1a is a plane side view of another form of test element.

FIGURE 2 is an end view of the reflectance element shown in FIGURE 1 with an Audigage transducer attached.

FIGURE 3 is a top view of the reflectance element attached to an Audigage transducer.

FIGURE 4 is an isometric view of the reflectance element with an Audigage transducer attached.

FIGURE 5 is a partial isometric view of another form of reflectance element.

In the drawings, the electrical circuit 10 is shown only in FIGURE 1, and then only in a simplified form, to point up the improvements in the method relating to the maintenance of a constant frequency, while measurements of sound intensity are taken. Referring briefly to the drawings, the following relationship of parts is shown.

The general Audigage circuit is illustrated at 10 connected through cable 12 to transducer 14 attaching to one end of trapezoidal reflectance element 16. Element 16 is shown to have a square, transverse, cross-section and is made of a dense material, such as a metal or alloy with a low acoustical impedance. The various surfaces, including side 18, end 20, bottom 21, top 22, and opposite end 24, are machined to smooth, uniform, plane surfaces. Element 16 has threaded collar 26 fitted adjacent to one end so that the element can be inserted through a threaded aperture in a process vessel, to hold same therein by engaging the threads within the aperture. Collar 26 may be omitted and other means of attachment used. FIGURE 2 is an end view and FIGURE 3 is a top view of the transducer and reflectance element shown in FIGURE 1. FIGURE 4 is an isometric view of this embodiment.

Element 16 comprises, therefore, a trapezoidal probe having at least one pair of parallel opposing plane surfaces, the ends of which are plane and are cut at angles other than normal to the parallel opposing surfaces. This element receives ultrasonic vibrations from transducer 14, having a plastic body in which is embedded piezo quartz crystal 28 (shown in dotted lines). Leads 30 and 32 are connected thereto and form cable 12 connected to circuit 10. Since the function of circuit 10 in exciting crystal 28 at ultrasonic frequencies is known, and no invention is being alleged as to this portion of the apparatus, it will be described only briefly so that one skilled in the art can understand the functioning thereof and the method as applied to the new reflectance element 16. In general, circuit 10 comprises a constant-frequency, self-excited oscillator when generates an alternating voltage to an X-cut quartz crystal 28.

The fundamental physical principles underlying the use of ultrasonic resonance for the measurement of thickness depend upon the facts that sound waves travel through a solid at a velocity which is a function of the density and elastic properties of the solid (this velocity is not greatly influenced by temperature fluctuations), and sound waves are reflected by surfaces separating two areas of different density or different acoustical impedances. When ultrasonic vibrations are introduced into a solid body having two parallel opposed surfaces, such as a pipe wall or sheet metal, at an angle normal to the surfaces, a standing wave, or resonance, can be developed at a frequency which depends on the thickness of the solid and the velocity of sound therein. The fundamental frequency at which thickness resonance vibration is produced is expressed by the relation:

$$f_1 = \frac{C}{2t}$$

where $f_1$ = the frequency in cycles per second
$C$ = the velocity of sound in the solid in inches per second
$t$ = the thickness of the solid in inches.

Thickness resonance occurs at all harmonics of the fundamental frequency, such as $f_2 = 2f_1$, $f_3 = 3f_1$ to $f_n = nf_1$. Thus, the frequency difference between two adjacent harmonics in a solid is numerically equal to the fundamental frequency. The thickness of the solid can be determined from the equation, $$t = \frac{C}{2f_1}$$

where the fundamental frequency is known and the velocity of sound in the material is known. This is the basic principle on which the Audigage and related instruments are based.

In accordance with this invention, the transducer of the Audigage, or equivalent instrument, is applied to the end surface of our novel test element, rather than to a wall of a process vessel or pipe. The test element has at least two longitudinal surfaces which are plane and parallel. The ends of the element (20 and 24) are plane and are cut at angles other than 90° to the planes of the parallel longitudinal surfaces (21 and 22). In general, the shape and dimensions of the element 16 are selected so that sound waves produced by transducer 14 enter the element normal to end surface 24 and reflect back and forth between parallel plane surfaces 22 and 21 until they strike end surface 20. The angle $\theta$ at which end surface 20 intersects plane surfaces 21 and 22 is selected so that the reflected wave from surface 21 strikes surface 20 normally. Consequently, angle $\theta$ either must be equal to $\phi$, in which case a cross-sectional view lying in a longitudinal plane perpendicular to surfaces 21 and 22 takes the form of a parallelogram, or supplementary to $\theta$, in which case a similar cross-section takes the form of an isosceles trapezoid. With either arrangement, the waves are reflected back along their original path, again reflecting between surfaces 22 and 21, until the returning wave strikes end surface 24 and transducer 14. It is apparent that end surface 24 must intersect plane surfaces 21 and 22 at an angle ($\phi$) other than 90°.

The dimensions of our test element can be calculated from trigonometric relationships based on (1) the distance ($x$) between the parallel longitudinal surfaces, (2) the length (L) of these surfaces, and (3) the angles $\phi$ and $\theta$ at which the end surfaces intersect these parallel surfaces. For example, when $\phi$ and $\theta$ are equal to 30°, the length, L, is calculated by the equation $$L = X\left[\frac{1}{\sqrt{3}} + 2n\sqrt{3}\right]$$

where $n$ is any whole number. Similarly, when $\phi$ and $\theta$ are equal to 45°, $$L = (2n)x$$

When $\phi$ is equal to 30° and $\theta$ is equal to 150°, $$L = X\left[\frac{4}{\sqrt{3}} + 2n\sqrt{3}\right]$$

In the first two instances, the number of reflections is equal to $(4n+1)$, while in the last instance, i.e., where $\theta$ is supplementary to $\phi$, the number of reflections is equal to $(4n+3)$. It will be apparent that the selection of relatively high values for $n$ will lead to the realization of high sensitivity.

Although various forms of known electronic circuits are suitable for use with our element and in our method, the basic circuit 10 represents one type now in commercial use. This self-excited oscillator has variable frequency control and generates an alternating voltage which is applied to quartz crystal 28. Tube 30 and associated resistances and condensers represent the input circuit, of which coils 32 and 34 are transducer and pick-up coils, respectively. By tuning the oscillator or transducer to a frequency that is an integral multiple of the fundamental frequency of the harmonic wave in element 16, there will be generated a sharp increase in the amplitude of vibration throughout the length of element 16. Using the circuitry shown, this condition is evidenced by a maximum deflection of meter 36. Variable condenser 38 is connected in series with coil 32 to form a tank circuit. Fixed condensers 40 and 42, variable condenser 44 and coil 46 constitute a second tank circuit which determines the frequency of oscillation in the grid circuit of tube 30. When the tank circuit of coil 32 and variable condenser 38 are tuned to the same frequency as the second tank circuit, then the oscillator is transmitting radio frequency oscillations in line 12. Since the operation of this type of circuit is well known to one skilled in this art, no further explanation is necessary.

To illustrate the use of our device in determining the deposit-forming tendency of an environment, a test element is inserted into the environment, the transducer is positioned against its external end, and power is supplied to circuit 10. The frequency of the wave introduced into element 16 by transducer 14 is adjusted to cause a maximum point to be reached in the reflected power. The frequency at which this occurs is the resonant frequency, or a harmonic thereof, of the test element. The power amplitude at resonance is visibly manifested on meter 36, and is recorded. Then the element is permitted to remain exposed to the test environment for a period of time, after which circuit 10 again is energized, input power of the initial frequency again is introduced into element 16, and the power amplitude again is noted and recorded. Because the fraction of incident energy reflected upon each contact with a surface of the element is dependent on the difference between the acoustical impedance of the element and that of the atmosphere in contact with it, more energy is lost per reflection when a foreign deposit has accumulated on the surface of the element than is lost when the surfaces are clean. While the energy loss per reflection may be small, the apparatus and method of this invention, by causing the occurrence of many reflections, multiplies this loss and provides a sensitive means for determining the tendency of an atmosphere to form a deposit of foreign material on surfaces which it contacts, and the rate at which such deposits are formed.

As a specific example of such use of our method and apparatus, with element 16 made of steel in the form of a block about one inch square, and cut at each end at an angle of 30°, it was found that the resonant frequency (*f*) was 0.63 megacycle. Meter 36 showed a reading of 0.8 milliampere. A soft wax was then spread on the faces of the metal element to a thickness of about 1/64 inch to simulate a wax coating which might be expected to form in a crude oil pipe line. The meter reading dropped to 0.05 milliampere.

As mentioned previously, our apparatus and method are also useful in determining metal loss due to corrosion or erosion. This use depends upon the fact that the resonant frequency of our element is dependent upon the distance between the parallel surfaces and upon the length of the element. It is apparent that the distance between the parallel surfaces decreases as the surfaces are corroded or eroded. This decrease causes a change in resonant frequency, which, according to our invention, is determined and correlated in terms of metal loss. By causing a number of reflections, rather than the single reflection relied on in prior art apparatus and methods, we greatly increase sensitivity and can determine corrosion or erosion rate in a very short time. Prior art devices require that metal surfaces be exposed to corrosive or erosive environments for long periods of time before metal losses become sufficient to be measurable.

As a specific example of this use of our invention, a steel element having the dimensions and shape described above is exposed to the test environment and the resonant frequency is determined to be 0.63 megacycle. After a period of time the resonant frequency is again determined, and the change in frequency is correlated with metal loss.

It is apparent from the foregoing detailed description, the invention relates broadly to a measuring device which includes a solid test element capable of transmitting ultrasonic vibrations, wherein the test element is so shaped as to present at least two parallel elongated sides and oblique ends, one of which ends carries the ultrasonic-vibration-producing means and the other of which is exposed to an atmosphere which changes the dimensions of the test element, or which presents a vibration-absorbing surface. The device is held in any base member adapted to hold same in contact with the environment to be tested. One form of base member is threaded collar 26 shown in the drawings. The environment may be corrosive in the sense that it combines with the test element and causes the disintegration thereof. The environment may be in the liquid or gaseous phase and may change the dimensions of the test element through mechanical carrying away of portions of the exposed surfaces as in erosion. Alternately, the environment to be tested may cause an appreciation of or addition to the surface of the test element of sound-absorbing material such as incrustations of carbon in a catalyst chamber, deposits of wax in a pipe line, accumulations of scale in the combustion chamber of an internal combustion engine, scale deposits in boiler tubes, sediments, etc.

Examples of corrosive atmospheres are liquid and gaseous media containing acids such as hydrochloric acid, hydrofluoric acid, nitric acid, sulfuric acid, or alkalis such as sodium hydroxide, potassium hydroxide, etc. Media containing corrosive salts, such as ammonium salts, fertilizers, or corrosive gases including the halogens, nitrogen oxides, oxygen, steam and air mixtures, etc., may be tested with the device of this invention.

The test element need not be trapezoidal in shape as long as it has at least two parallel sides along its longest dimension and two opposed ends which are at an angle other than 90° to the planes of the sides. $\phi$ as shown in the drawing designates the angle between one end surface and the normal. Since the angles on opposite sides of a line intersecting parallel lines are equal, $\phi$ also designates the angle of intersection between the plane surface of the end and the other parallel side of the test element, which would be 60° or 30° in the embodiment shown. Angles of obliqueness of the ends of less than 5° are not practical since the difficulty in tuning to a condition of resonance is thereby increased. Thus element 16 may be a prism having polygon bases (20 and 24) which lie in parallel planes or perpendicular planes, with any number of lateral faces (such as 18 and 22) wherein at least two are parallel. Element 16 may be a quadrangular prism, pentagonal prism depending on whether the bases 20 and 24 are quadrilaterals, pentagons, etc., or a parallelepiped wherein 20 and 24 are parallelograms.

This is further illustrated by reference to FIGURE 1a showing a side view of another form of reflectance element with the side 18, bottom 21, top 22 and end 24 in the same respective space relationships as that of FIGURE 1, but with end 20 formed at a different angle $\theta$. In FIGURE 1a, bottom 21 and top 22 are parallel but the ends 20 and 24 are not parallel. Side 18 need not be a plane surface and need not be parallel to the opposite side. The non-parallel sides such as 18 may be concave, convex or any irregular shape. This is shown in FIGURE 5, a partial isometric view of element 16 wherein end 20 meets top 22 at an angle other than 90°, and side 18 and opposite side 38 are concave.

The test or reflectance element 16 may be made of metal, or metal alloy, having sound-transmitting properties where loss of the surface is to be measured. For purposes of determining the effect of corrosive atmospheres on various materials of construction, a wide choice of metals is available from which the test elements may be fabricated. The same is true of threaded collar member 26 and the remaining parts of the apparatus. Threaded collar member 26 may be welded, bolted or otherwise affixed to the test element 16. Welding is preferred where the device is to be used to determine the corrosivity of confined atmospheres under pressure because of the necessity of a pressure-tight seal when the probe is inserted through a vessel wall, pipe or valve housing.

When the device is used for measuring the deposition of foreign materials on the surface of the reflectance element 16, a non-corrodible metal, glass, or other solid material having a low acoustical impedance is used in its construction.

What is claimed is:

1. An electroacoustical system comprising a probe element consisting of an elongated solid body of low acoustical impedance, said body having two opposed, exposed, longitudinal, plane, parallel side surfaces, an exposed plane end surface and a protected plane end surface, said exposed plane end surface and said protected plane end surface being opposed to each other and each intersecting said longitudinal surfaces obliquely at an angle greater than 5° from the longitudinal axis of said body, the length of said sides in relation to the distance therebetween being such that ultrasonic waves transmitted into said body normal to said protected end surface reflect internally at least once from each of said longitudinal surfaces and are returned along substantially the same path by internal reflection from said exposed end surface, and means attached to said protected end surface for continuously transmitting ultrasonic waves, of such frequency as to establish a resonance condition of the waves in the body, normal to said protected end surface and means for measuring the frequency changes thereof under conditions of resonance as said exposed surfaces are eroded.

2. An electroacoustical system comprising a probe element consisting of an elongated solid body of low acoustical impedance, said body having two opposed, exposed, longitudinal, plane, parallel side surfaces, an exposed plane end surface and a protected plane end surface, said exposed plane end surface and said protected plane end surface being opposed to each other and each intersecting said longitudinal surfaces obliquely at an angle greater than 5° from the longitudinal axis of said body, the length of said sides in relation to the distance therebetween being such that ultrasonic waves transmitted into said body normal to said protected end surface reflect internally at least once from each of said longitudinal surfaces and are returned along substantially the same path by internal reflection from said exposed end surface, and means attached to said protected end surface for continuously transmitting ultrasonic waves, of such frequency as to establish a resonance condition of the waves in the body, normal to said protected end surface and means for measuring the amplitude changes thereof under conditions of resonance as said exposed surfaces are eroded.

3. The method of measuring the corrosivity of an environment which comprises exposing an elongated solid body of low acoustical impedance to said environment, said body being capable of transmitting a continuous ultrasonic wave of selected frequency from a point of transmission at one end thereof to the other end and returning said wave to the point of transmission by internal reflection back and forth from the elongated sides thereof, transmitting a continuous ultrasonic wave into said body at said point of transmission at one end thereof while the other end and said sides are in direct contact with said atmosphere, adjusting the frequency of said ultrasonic wave to a condition of internally reflected resonance in said body, changing the frequency of said ultrasonic wave at said point of transmission at said one end of said body as said surfaces in direct contact with said atmosphere are corroded to establish a second resonance frequency and measuring the difference in said frequencies as a function of the corrosivity of said environment.

4. The method of measuring the rate of solid deposition from an environment which comprises exposing an elongated solid body of low acoustical impedance to said environment, said body being capable of transmitting a continuous ultrasonic wave of selected frequency from a point of transmission at one end thereof to the other end and returning said wave to the point of transmission by internal reflection back and forth from the elongated sides thereof, transmitting a continuous ultrasonic wave into said body at said point of transmission at one end thereof while the other end and said sides are in direct contact with said atmosphere, adjusting the frequency of said ultrasonic wave to a condition of internally reflected resonance in said body, and measuring the change in amplitude of said ultrasonic wave at said point of transmission at one end of said body as solid deposition from said atmosphere occurs on said surfaces as a function of the rate of solid deposition.

References Cited in the file of this patent

UNITED STATES PATENTS

| | | |
|---|---|---|
| 2,514,080 | Mason | July 4, 1950 |
| 2,522,924 | Branson | Sept. 19, 1950 |
| 2,618,968 | McConnell | Nov. 25, 1952 |
| 2,763,534 | Campbell | Sept. 18, 1956 |
| 2,851,884 | Arenberg | Sept. 16, 1958 |
| 2,966,058 | McSkimin | Dec. 27, 1960 |

FOREIGN PATENTS

| | | |
|---|---|---|
| 564,513 | Great Britain | Oct. 2, 1944 |
| 723,112 | Great Britain | Feb. 2, 1955 |